US007827182B1

(12) United States Patent
Panigrahy

(10) Patent No.: US 7,827,182 B1
(45) Date of Patent: Nov. 2, 2010

(54) SEARCHING FOR A PATH TO IDENTIFY WHERE TO MOVE ENTRIES AMONG HASH TABLES WITH STORAGE FOR MULTIPLE ENTRIES PER BUCKET DURING INSERT OPERATIONS

(75) Inventor: Rina Panigrahy, Sunnyvale, CA (US)

(73) Assignee: Cisco Technology, Inc, San Jose, CA (US)

( * ) Notice: Subject to any disclaimer, the term of this patent is extended or adjusted under 35 U.S.C. 154(b) by 879 days.

(21) Appl. No.: 10/859,260

(22) Filed: Jun. 2, 2004

(51) Int. Cl.
*G06F 17/30* (2006.01)
(52) U.S. Cl. ...................................... 707/747; 709/238
(58) Field of Classification Search ................ 707/2, 707/999.002, 747; 709/238
See application file for complete search history.

(56) References Cited

U.S. PATENT DOCUMENTS

| | | | | |
|---|---|---|---|---|
| 5,893,086 | A * | 4/1999 | Schmuck et al. | 707/1 |
| 6,615,336 | B1 | 9/2003 | Chen et al. | |
| 6,819,339 | B1 * | 11/2004 | Dowling | 715/738 |
| 2004/0153957 | A1 * | 8/2004 | Feldman et al. | 714/795 |

OTHER PUBLICATIONS

Pagh et al., *Cuckoo Hashing*, Lecture Notes in Computer Science, Springer-Verlang GmbH, 26 pages, 2001.
Devroye et al., *Cuckoo Hashing: Further Analysis*, Information Processing Letters, vol. 86, pp. 215-219, May 2003.
Fotakis et al., *Space Efficient Hash Tables with Worst Case Constant Access Time*, 20th Annual Symposium on Theoretical Aspects of Computer Science, Feb. 2003.
Azar et al., *Balance Allocations (Extended Abstract)*, Annual ACM Symposium on Theory of Computing, Proceedings of the Twenty-sixth Annual ACM Symposium on Theory of Computing, pp. 593-602, 1994.

Andrei Broder and Michael Mitzenmacher, *Using Multiple Hash Functions to Improve IP Lookups*, INFOCOM 2001, Twentieth Annual Joint Conference of the IEEE Computer and Communications Societies, vol. 3, pp. 1454-1463, 2001.
Berenbrink et al., *Balanced Allocations: The Heavily Loaded Case*, Annual ACM Symposium on Theory of Computing archive, Proceedings of The Thirty-Second Annual ACM Symposium on Theory of Computing Table of Contents, pp. 745-754, 2000.
Czumaj et al., *Randomized Allocation Processes*, Foundations of Computer Science, Proceedings IEEE 38th Annual Symposium on, pp. 194-203, Oct. 1997.
Dietzfelbinger et al., *Dynamic Perfect Hashing: Upper and Lower Bounds*, Foundations of Computer Science, 1988., 29th Annual Symposium on, pp. 524-531, Oct. 1988.
Fredman et al., *Storing a Sparse Table with O(1) Worst Case Access Time*, Journal of the ACM (JACM), vol. 31, Issue 3, pp. 538 544, Jul. 1984.

\* cited by examiner

Primary Examiner—John R. Cottingham
Assistant Examiner—Kimberly Lovel
(74) Attorney, Agent, or Firm—The Law Office of Kirk D. Williams

(57) ABSTRACT

Entries are arranged in hash tables with storage for multiple entries per bucket with entries being shifted among hash tables to make room for entries being added. A path is determined through a search of the hash tables to identify where to move entries during insert operations among the hash tables to make room for a data item being added. Entries are moved and a data item added according to the identified path. Many different types of searches may be used, such as breadth-first, depth-first, random walk, etc. Also, a free position at the end of the path may be identified by being a bucket having a lowest occupancy level in a first predetermined number of levels of the search, a first bucket encountered having space available or an occupancy level less than a predetermined threshold level, with the predetermined threshold level typically being less than that of a full bucket, etc.

36 Claims, 11 Drawing Sheets

SEARCHING FOR A PATH TO IDENTIFY WHERE TO MOVE ENTRIES AMONG HASH TABLES WITH STORAGE FOR MULTIPLE ENTRIES PER BUCKET DURING INSERT OPERATIONS

TECHNICAL FIELD

One embodiment of the invention relates to communications and computer systems, especially networked routers and computers, packet switching systems, and other devices performing lookup operations on data; and more particularly, one embodiment relates to searching for a path to identify where to move entries during insert operations among hash tables with storage for multiple entries per bucket and corresponding different hash functions to make room for a data item being added, and for moving the entries and adding the data item according to the identified path.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation typically including one or more lookup operations must be performed on the packet.

The use of hash functions and hash tables is one approach for performing lookup operations on a set of data to identify a matching item, if one exists. Typically, a hash function is used where the possible values of the data is larger than the size of memory or other storage mechanism desired to use for storing the data, and the actual enumerated data items is sparse relative to the range of possible values.

Standard issues for implementations of lookup mechanisms using hash functions include the time for inserting an item and the maximum time required for looking up an item. Typically, it is important for a lookup mechanism to have a maximum bound on the time required to lookup a data item. These problems typically drive the need for new and different hashing mechanisms and methods. For example, when two data items to be stored are hashed to a same position, a collision occurs, and some mechanism is used for storing the multiple values, such as pre-allocating space for multiple data items in the bucket (i.e., the position in the hash table to which the value hashes) for each hash value in the memory, or using a linked list of items for storing multiple items in a bucket. Implementations that use linked lists that require a memory read operation for each of the linked elements are especially time consuming, and insertion mechanisms that do not bound the number corresponding to a single hashed value may be unacceptable for certain real-time applications.

Many different techniques are known and used for hashing. A prior approach uses a single hash function that generates a fixed random position within the storage space based on the value to be stored and evenly stores the data across the storage space. Multiple items are stored within a bucket such as by a linked list and/or pre-allocated space in each bucket for storing multiple data items. Another prior approach uses a single hash table and function with space allocated in each bucket to store multiple data items.

Another prior approach is to use two independent hash functions with two different hash tables with each bucket having space to store a single item. When inserting a data item, the position to add the data item is determined for each of the different hash functions, and the data item is inserted in the bucket of the two identified buckets containing the smaller number of data items. If both non-full buckets contain the same number of items (i.e., zero or one), then data item is added to the bucket in the "left" has table (i.e., always the same predetermined hash table). If both buckets are full prior to adding the item to the hash table, then the item is stored in a separate data structure and it will be located in a secondary search operation typically performed by a software process, rather than hardware optimized for maintaining and searching hash tables. When searching the two hash tables, two lookup operations are performed in parallel on each of the two hash tables.

Another prior approach, known as cuckoo hashing, uses two hash tables with each bucket having a single entry. Data values are inserted sequentially into the hashing tables. For a given value to be added, it is added to the first hash table at the position according to the first hash function. If the position was empty prior to the addition, then processing is complete. Otherwise, the value previously stored at that location is stored in the second hash table at the position according to the second hash function. If the position was empty prior to the addition, then processing is complete. Otherwise, the value previously stored at that location is stored in the first hash table at the position according to the first hash function, and so on. To bound the insert time, if a maximum number of iterations is exceeded, the hash functions are considered to have failed and different hash functions are used for all the entries. Some drawbacks of this approach include the large number of entries required for each of the hash tables and the worst-case insertion time of an entry. Also, this approach requires each hash table to have a large number of buckets, and the insert time can be long.

SUMMARY

Disclosed are, inter alia, methods, apparatus, data structures, computer-readable media, mechanisms, and means for arranging entries in hash tables with storage for multiple entries per bucket, and how to move entries among hash tables to make room for entries being added. A path is determined through a search of the hash tables to identify where to move entries during insert operations among the hash tables to make room for a data item being added. Entries are moved and a data item added according to the identified path. Many different types of searches may be used, such as, but not limited to breadth-first, depth-first, random walk, etc. Also, a free position at the end of the path may be identified, for example, by being a bucket having a lowest occupancy level in a first predetermined number of levels of the search, a first bucket encountered having space available or an occupancy level less than a predetermined threshold level, with the predetermined threshold level being less than that of a full bucket, etc.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
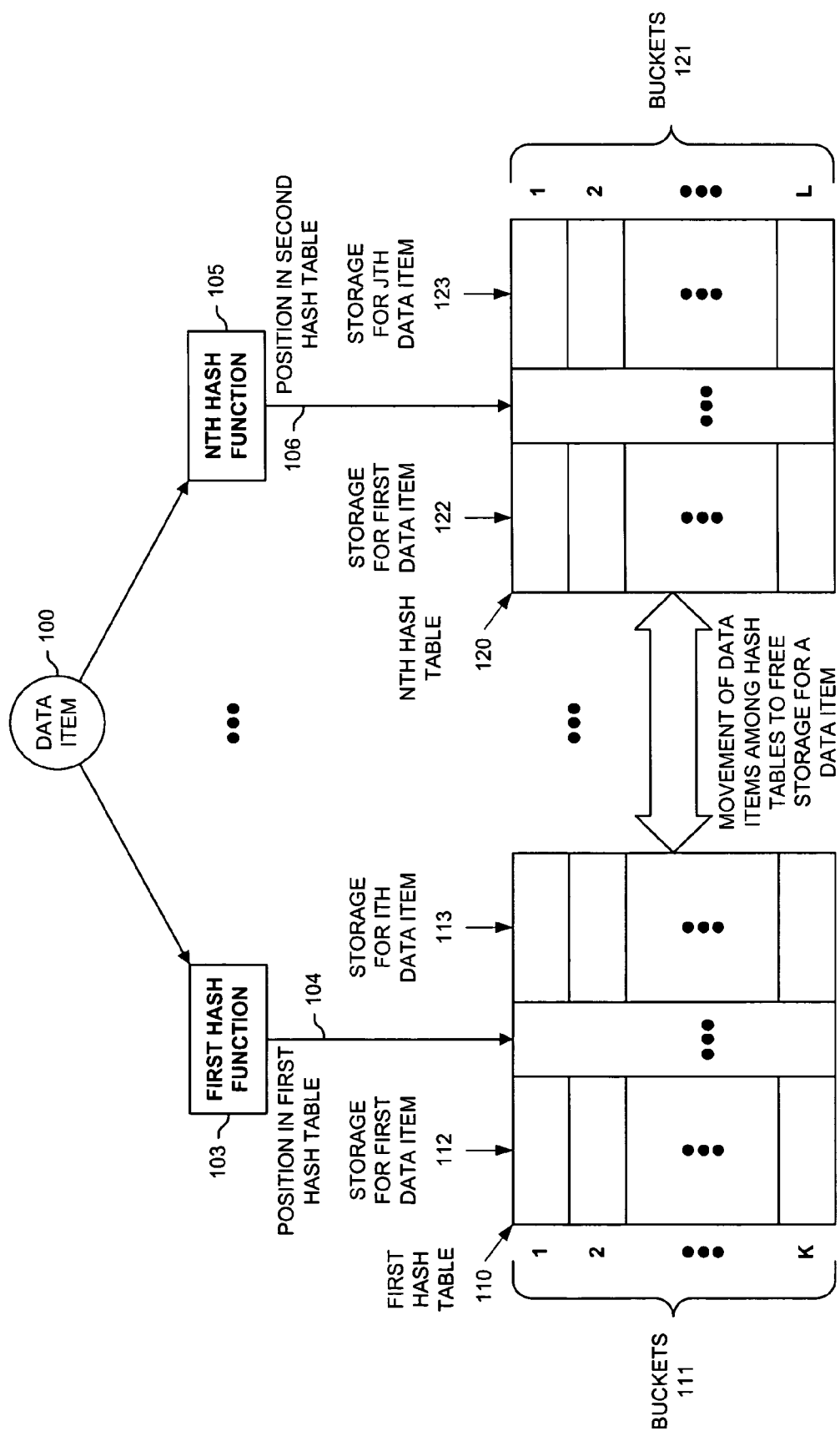
FIG. 1 is a block diagram illustrating multiple hash tables with buckets for storing multiple data items used in one embodiment.

Disclosed are, inter alia, methods, apparatus, data structures, computer-readable media, mechanisms, and means for arranging entries in hash tables with storage for multiple entries per bucket, and how to move entries among hash tables to make room for entries being added.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Disclosed are, inter alia, methods, apparatus, data structures, computer-readable media, mechanisms, and means for arranging entries in hash tables with storage for multiple entries per bucket, and how to move entries among hash tables to make room for entries being added. A path is determined through a search of the hash tables to identify where to move entries during insert operations among the hash tables to make room for a data item being added. Entries are moved and a data item added according to the identified path. Many different types of searches may be used, such as, but not limited to breadth-first, depth-first, random walk, etc. Also, a free position at the end of the path may be identified, for example, by being a bucket having a lowest occupancy level in a first predetermined number of levels of the search, a first bucket encountered having space available or an occupancy level less than a predetermined threshold level, with the predetermined threshold level being less than that of a full bucket, etc.

One embodiment stores values in multiple hash tables for use in hash-based lookup operations. Each of the hash tables includes multiple buckets sized to store multiple data items. A first bucket within a first hash table is determined based on hashing a particular data item using a first hash function. A second bucket within the second hash table is determined based on hashing the particular data item using a second hash function. In response to identifying that the first and second buckets are both full, a breadth-first search is performed in the first and second hash tables from the first hash bucket to identify an identified bucket having space to add a data item along a path identified by the breadth-first search. The breadth-first search including traversing buckets and data items stored within the first and second hash tables based on stored data items in each particular bucket encountered. The first and second hash tables are updated to move previously stored data items based the identified path including moving one of said previously stored data items to the identified bucket, and the particular data item is added to the first hash bucket.

In one embodiment, the breadth-first search traverses at least two bucket levels. In one embodiment, the breadth-first search traverses at least three bucket levels. In one embodiment, a second particular data item is identified. A third bucket is determined within the first hash table using the first hash function on the second particular data item. A fourth bucket is determined within the second hash table based on hashing the second particular data item using the second hash function. In response to identifying an empty position in either the third or fourth bucket, the second particular data item is stored in the empty position.

One embodiment stores values in multiple hash tables for use in hash-based lookup operations. A breadth-first search in the multiple hash tables to identify an identified bucket having space to add a data item along a path identified by the breadth-first search through the plurality of hash tables. The breadth-first search typically includes traversing buckets and data items stored within the multiple hash tables based on stored data items in each particular bucket encountered, and traversing to buckets in different hash tables using corresponding hashing functions for each of the items stored in an encountered bucket. The hash tables are updated to move previously stored data items based the identified path, which includes moving one of the previously stored data items to the identified bucket. The particular data item is added to the first bucket in the identified path.

In one embodiment, the breadth-first search traverses at least two bucket levels. In one embodiment, the breadth-first search traverses at least three bucket levels. In one embodiment, the breadth-first search is performed for a predetermined number of levels, and the identified bucket is determined by selecting one of the buckets encountered during said breadth-first search with a lowest occupancy level. In one embodiment, the predetermined number of levels is a constant value of at least two. In one embodiment, in the predetermined number of levels is a constant value of at least three. In one embodiment, the identified bucket is the first bucket encountered with space available to store a data item. One embodiment includes comparing an occupancy level of the identified bucket with a predetermined threshold occupancy level, with the predetermined threshold occupancy level being less than the maximum number of data items that can be stored by the identified bucket.

It can be shown that in one embodiment using two hash tables with each bucket pre-allocated space for storing two data items that a minimum of an 83.75% memory utilization rate can be achieved. Thus, using hash tables with n entries each, the space required is 4n (i.e., n entries×two hash tables× two entries per bucket), and thus typically 0.8375×4n inserts can be performed without failing. In contrast, cuckoo hashing uses two hash tables each with n buckets and only one item per bucket, and it can be shown that it achieves only a 50% memory utilization and only n inserts can be performed without failing. Also, it can be shown that in one embodiment using two hash tables with each bucket pre-allocated space for storing two data items that each insert takes O(log n) time and a maximum of log log n+O(1) moves are required with each insert with high probability.

One embodiment stores values in multiple hash tables for use in hash-based lookup operations. Each of the hash tables includes multiple buckets sized to store multiple data items. A first hash table is randomly identified and a first bucket within the first hash table is determined based on hashing a particular data item using a first hash function. In response to identifying that the first bucket is full, a particular one of the multiple data items in the first bucket is selected, as well as a hash table different than the first hash table. The particular one of the data items is hashed to identify a second hash bucket. In response to identifying that the second has bucket is not empty, the particular one of the data items is moved from the first bucket to the second hash bucket, and the particular data item is stored in the first hash bucket.

One embodiment stores values in multiple hash tables for use in hash-based lookup operations. Each of the hash tables includes multiple buckets sized to store multiple data items. A random walk is performed in the hash tables to identify an identified bucket having space to add a data item along a path identified by the random walk. The random walk typically includes traversing buckets and data items stored within the hash tables based on stored data items in each particular bucket encountered. This includes randomly selecting one of the data items in an encountered full bucket and determining a next-level bucket using hashing function corresponding to a different hashing table. The hash tables are updated to move the previously stored data items based the identified path, which includes moving one of said previously stored data items to the identified bucket, with the particular data item being added to the first bucket in the identified path.

In one embodiment, the random walk traverses at least two bucket levels. In one embodiment, the random walk traverses at least three bucket levels. In one embodiment, the random walk is performed for a predetermined number of levels, and the identified bucket is determined by selecting one of the buckets encountered during said random walk with a lowest occupancy level. In one embodiment, the predetermined number of levels is a constant value of at least two. In one embodiment, in the predetermined number of levels is a constant value of at least three. In one embodiment, the identified bucket is the first bucket encountered with space available to store a data item. One embodiment includes comparing an occupancy level of the identified bucket with a predetermined threshold occupancy level, with the predetermined threshold occupancy level being less than the maximum number of data items that can be stored by the identified bucket.

One embodiment stores values in multiple hash tables for use in hash-based lookup operations. Each of the hash tables includes multiple buckets sized to store multiple data items. A multi-level search in a hash tables to identify an identified bucket having space to add a data item along a path identified by the multi-level search through the hash tables. The multi-level search typically includes traversing buckets and data items stored within the hash tables based on stored data items in particular buckets encountered and traversing to buckets in different hash tables using corresponding hashing functions for each of the items stored in the particular buckets. An occupancy level of the identified bucket is compared with a predetermined threshold occupancy level that is less than the maximum number of data items that can be stored by the identified bucket. The hash tables are updated to move previously stored data items based the identified path including moving one of the previously stored data items to the identified bucket. The particular data item is added to the first bucket in the identified path. In one embodiment, the identified bucket is a first bucket encountered during the multi-level search that the comparison of the occupancy level of the identified bucket with the predetermined threshold occupancy level identified to add a data item to the identified bucket.

Note, a hash function typically identifies a bucket and not a specific field within a bucket (otherwise, the specific field would typically be considered to be a bucket). The path identifying how to move entries between hash tables to make room for the item being added may indicated buckets or specific fields within buckets.

One embodiment stores values in hash tables for use in hash based lookup operations. A multi-level search in multiple hash tables for a predetermined number of levels or until a low-occupancy bucket is encountered with an occupancy level at or below a predetermined threshold occupancy level. The multi-level search includes traversing buckets and data items stored within the hash tables based on stored data items in each particular bucket encountered and traversing to buckets in different hash tables using corresponding hashing functions for each of the items stored in an encountered bucket. The low-occupancy bucket is used as an identified bucket or if no low-occupancy bucket was encountered in the multi-level search, then a bucket with a lowest-occupancy level from the buckets encountered during said multi-level search is selected as the identified bucket, and thus an identified patch is defined as the path through the hash tables to the identified bucket. The hash tables are updated to move previously stored data items based the identified path including moving one of said previously stored data items to the identified bucket. The particular data item is added to the first bucket in the identified path.

Turning to the figures, FIG. 1 is a block diagram illustrating multiple hash tables (110, 120) with buckets (111, 121) for storing multiple data items used in one embodiment. The number of hash tables and entries per hash table bucket used in an embodiment are typically sized to match the needs of the application. For example, one embodiment uses two hash tables, and one embodiment uses more than two hash tables. One embodiment provides storage for two entries per bucket, and one embodiment provides storage for more than two entries per bucket. The invention is extensible, and variations are within the scope and spirit of the invention.

First hash table 110 is shown to include multiple buckets 111 with storage (112, 113) provided for storing multiple data items per bucket. Similarly, Nth hash table 120 is shown to include multiple buckets 121 with storage (122, 123) provided for storing multiple data items per bucket. The number of buckets 111 and 121 and the storage (112, 113, 122, 123) is typically sized to meet the needs of the application, such as based on the number of data items expected to be stored, the variance of their values, the hash functions used, etc.

In one embodiment, a data item 100 is identified to be stored in one of the hash tables (110, 120). It is hashed using a hash function (103, 105) to identify a bucket position (104, 106) within buckets (111, 121) for each hash table (110, 120).

In one embodiment, if one of the identified buckets has space to store the data item 100, then in one embodiment, it is added to one of the identified buckets, typically the one with a lowest occupancy level (e.g., fewest number of entries). Otherwise, a search is performed to identify how to move stored items among hash tables (110, 120) to make room to add data item 100. In one embodiment, a multi-level search is always performed for some predetermined number of search levels (e.g., a predetermined constant value such as two, three, four, five, etc.) to identify a set of buckets which have space to add an entry. This search is performed for the predetermined number of levels even if a non-full bucket is encountered at a level preceding the predetermined number of levels. Then, one of these buckets in the search space identified by the predetermined number of levels with space to add the entry is selected as the end of the path identifying how to move entries among hash tables. Note, depending on the embodiment, the operations on each hash table (110, 120) are performed in parallel, serially, or some combination thereof.

For ease of reader understandability, aspects of the invention will typically be described in terms of two hash tables, two entries within a hash table bucket, etc. as using two items in an explanation presents the aspect of the invention, is easier to depict in a drawing without too much extra information to cloud the aspect being described than with more than two items. The communicated aspect can be used by one skilled in the art to implement and use embodiments with two or more than two hash tables, hash functions, entries per bucket, etc.

Figure 2:
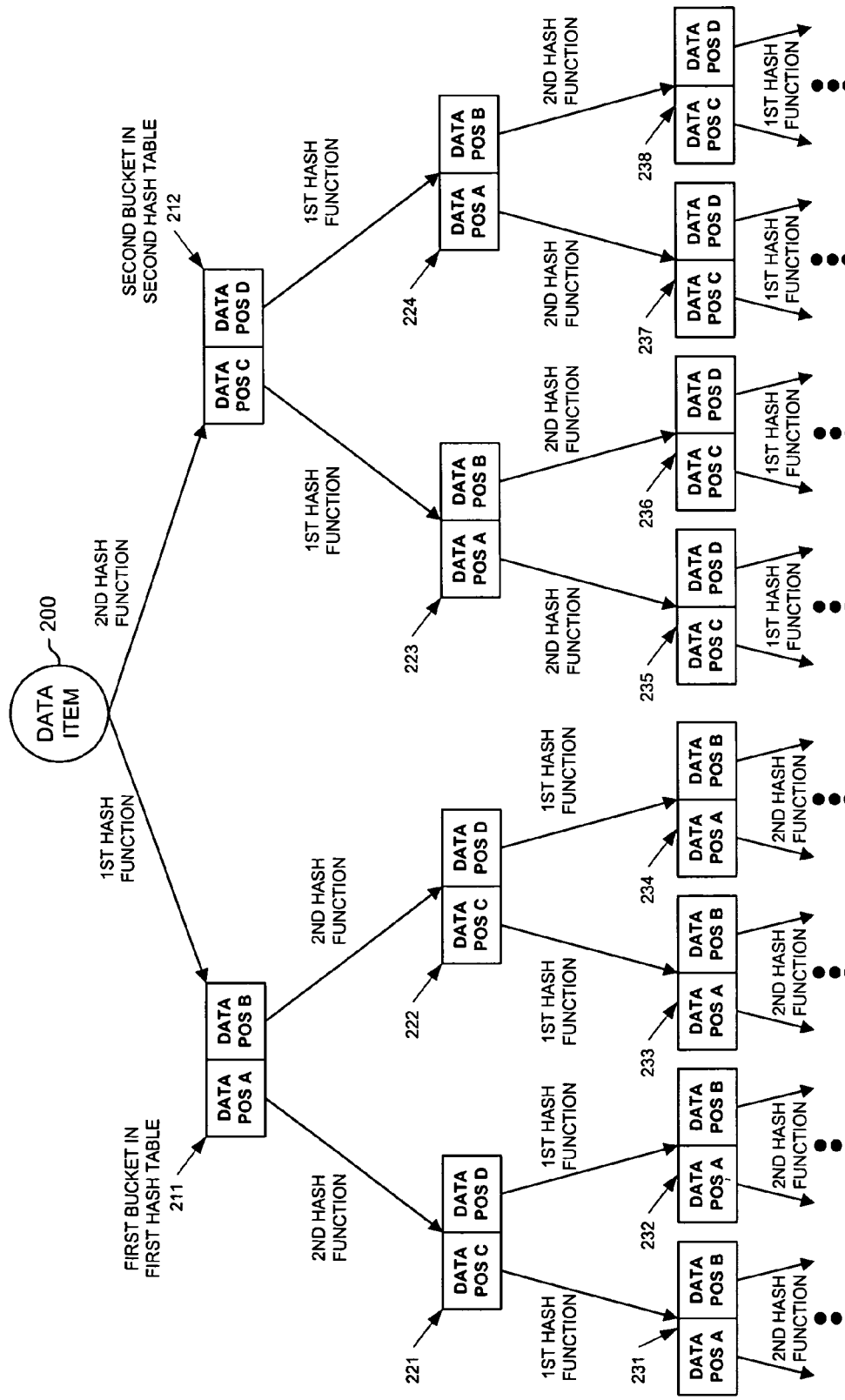
FIG. 2 is a block diagram illustrating searching for a non-full bucket used in one embodiment.

FIG. 2 illustrates a possible search space for moving data items stored in a first and a second hash table to make room to add a new item. Each hash table has a hash function associated with it. A data item can be added to any of the hash tables in a bucket identified by the corresponding hash table if there is space currently available in one of the buckets. If there is not space, then one or more data items can typically be moved to other hash tables, which may take several levels of movement as space may need to be freed for the first data item being moved, and so on. In one embodiment, a multi-level search is always performed for some predetermined number of search levels (e.g., a predetermined constant value such as two, three, four, five, etc.) to identify a set of buckets which have space to add an entry. This search is performed for the predetermined number of levels even if a non-full bucket is encountered at a level preceding the predetermined number of levels. Then, one of these buckets in the search space identified by the predetermined number of levels with space to add the entry is selected as the end of the path identifying how to move entries among hash tables. One way to determine how to move items is to search the space of possible moves, such as that shown in FIG. 2.

This example of the search space assumes that there are two hash tables, and each bucket within a hash table has space to store two items. Also, the reference to positions A and B (POS A and POS B) refer to storage space in a bucket in the first hash table, and positions C and D (POS C and POS D) refer to storage space in a bucket in the second hash table.

A data item 200 to be stored in either the first or second hash table is hashed using corresponding hash functions to identify buckets 211 and 212, where it must be stored in one of these two buckets 211 and 212. If there is no space available in either of these two buckets 211 and 212, it might be possible to move data items stored therein to a different hash table to free up a storage position in either bucket 211 or 212, with this process possibly repeating for several levels. For example, a first-level of movement is illustrated from buckets 221-224, and a second-level of movement is illustrated from buckets 231-238.

Thus, the movement of data items can be viewed as a tree which can be searched to identify an empty position, with the path through the tree to the empty position identifying the data items to be moved and to where to move each of them. As shown, each data item stored in a bucket in a particular hash table can possibly be moved to one of the other hash tables. Thus, the size of the search space is determined based on the number of data items that can be stored per bucket and the number of hash tables used.

Figure 3A:
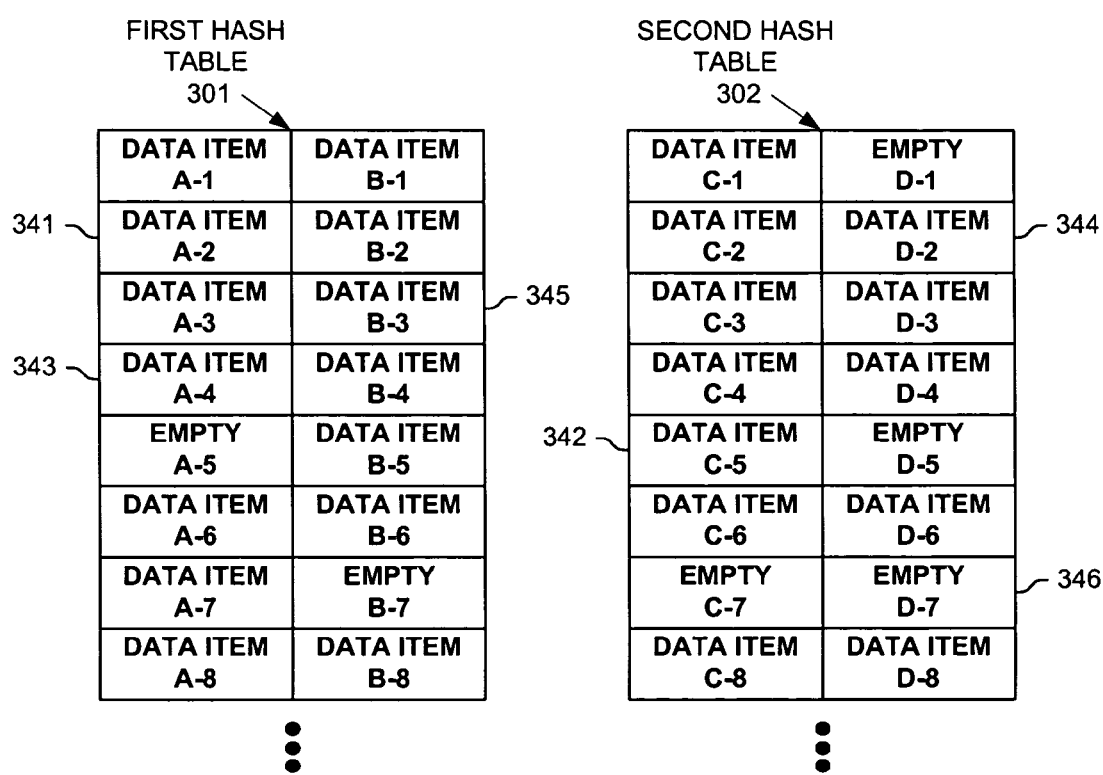
FIGS. 3A-C are block diagrams illustrating the movement of data items between buckets of multiple hash tables according to an identified path as performed in one embodiment.
Figure 3B:
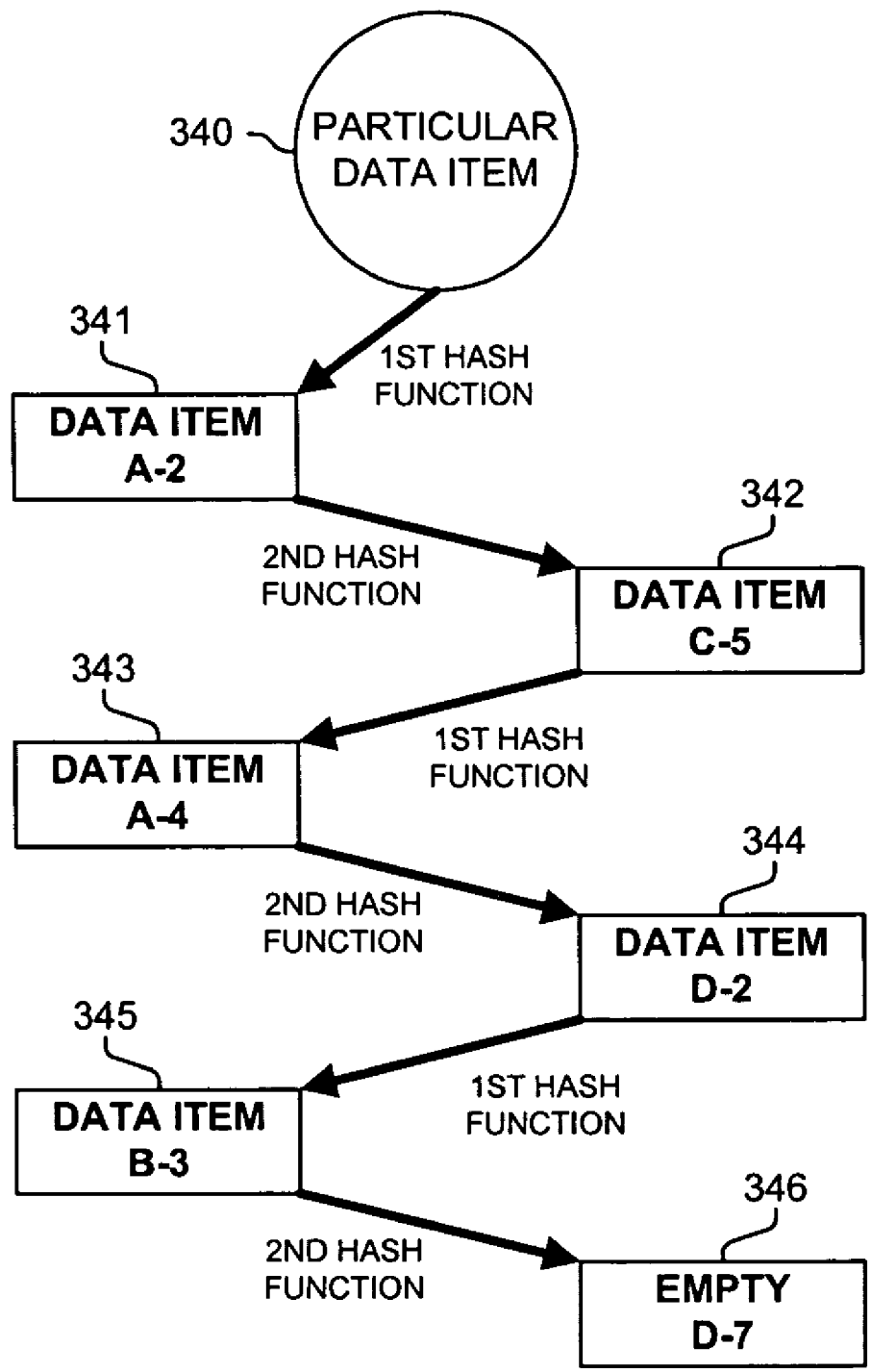
Figure 3C:
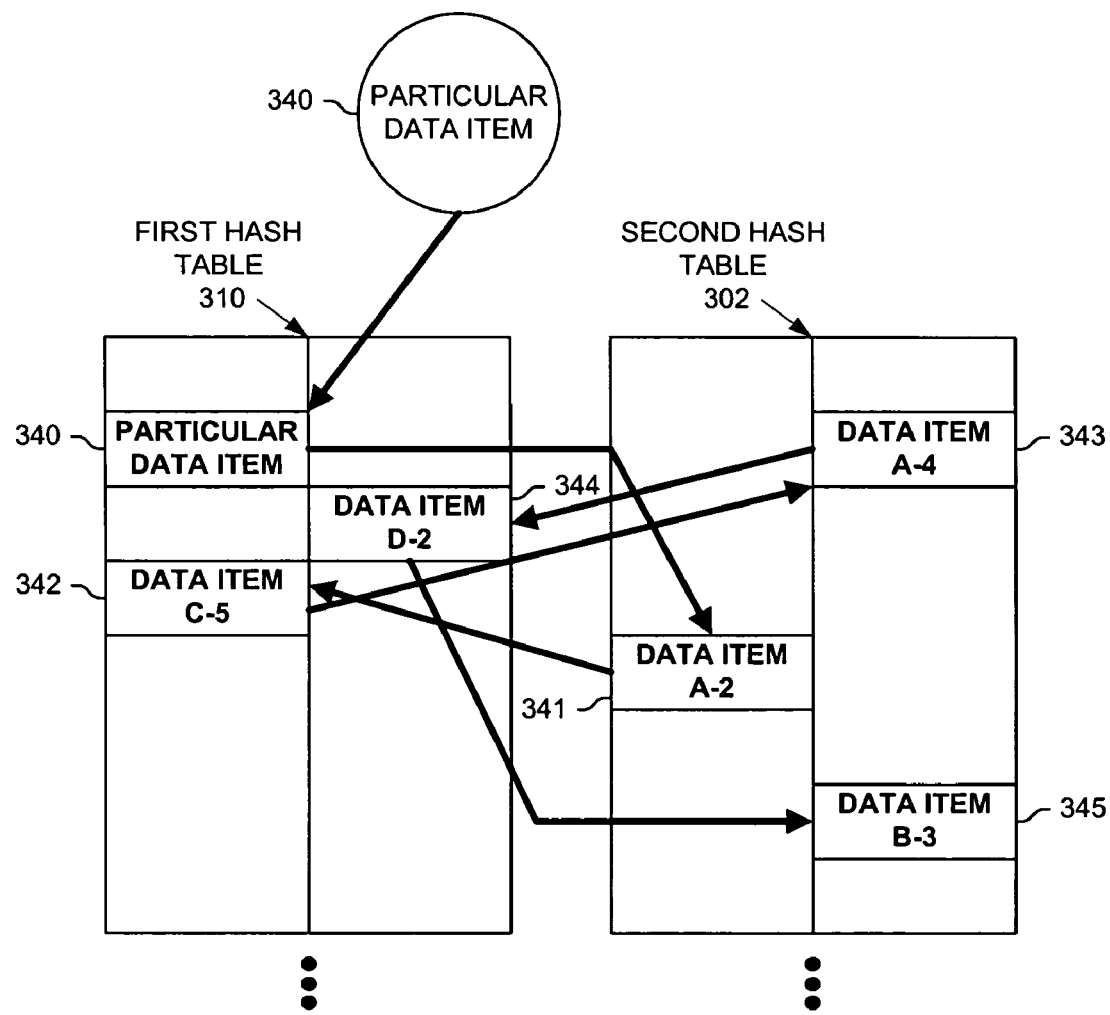

FIGS. 3A-C are block diagrams illustrating the movement of data items between buckets of multiple hash tables according to an identified path as performed in one embodiment. FIG. 3A illustrates a first hash table 301 with storage space for two data items per bucket, and a second hash table 302 with storage space for two data items per bucket. For the example shown in FIGS. 3A-C, if a data item is stored in a bucket, it is denoted as "DATA ITEM" with the corresponding storage position (i.e., A-x, B-x, C-x, D-x, where x represents the bucket number within its corresponding hash table). A storage position with space to store a data item is denoted as "EMPTY" with the corresponding storage position. FIG. 3A depicts the storage of items in hash tables 301 and 302 before a new item is added, and data items/positions 341-346 will be used as described hereinafter.

FIG. 3B illustrates a path through hash tables 301 and 302 (FIG. 3A) for adding particular data item 340 and moving data items from/to indicated positions 341-346. This path may be determined in different ways. For example, search may be performed to identify a path with a smallest number of moves required, identify a path to an item within the search space of a predetermined number of levels with a smallest occupancy level, or identify a path to another item as embodiments may be optimized to their particular application and/or data set to be stored in the hash tables. One embodiment uses a breadth-first search to identify the path. One embodiment uses a depth-first search to identify the path. One embodiment uses a random walk to identify the path. One embodiment uses another searching mechanism to identify the patch.

Thus, as shown in FIG. 3C, data item 345 is moved from first hash table 301 to previously empty position D7 in second hash table 302 (corresponding to the position determined by the hash function associated with second hash table 302). Data items 341-344 are also moved as shown and according to the path illustrated in FIG. 3B, and particular data item 340 is added to position A-2 of first hash table 301 as identified by the path illustrated in FIG. 3B.

Figure 4A:
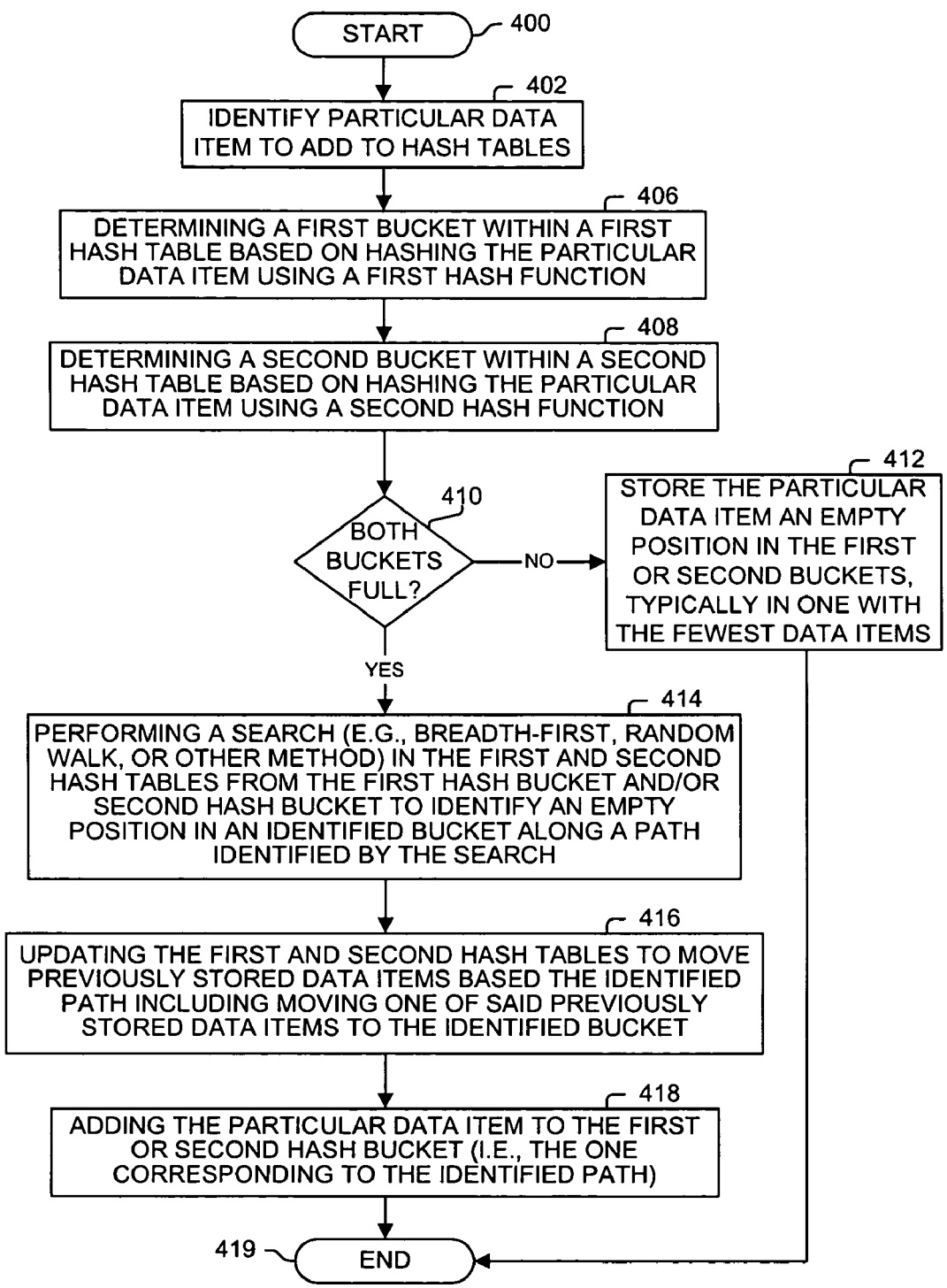
FIG. 4A is a flow diagram illustrating a process for identifying a path and migrating data items among multiple hash tables to be able to a data item as performed in one embodiment.

FIG. 4A is a flow diagram illustrating a process for identifying a path and migrating data items among multiple hash tables to be able to a data item as performed in one embodiment. Processing begins with process block 400, and proceeds to process block 402, wherein a particular data item to add to the hash tables is identified. Next, in process block 406, a first hash bucket within a first hash table is determined by hashing the particular data item using a first hash function. In process block 408, a second hash bucket within a second hash table is determined by hashing the particular data item using a second hash function. As determined in process block 410, if there is space to add the particular data item in either the first or second bucket, then in process block 412, it is stored therein, typically in the one with the fewest number of data items already stored therein (i.e., the smallest occupancy level). Otherwise, in process block 414, a search (e.g., breadth-first, random walk, or any other search) is performed to identify a path through the first and second hash tables to identify an empty position. In process block 416, the first and second hash tables are updated to move the previously stored data items based on the identified path, which includes moving a data item to the identified bucket with storage space available. In process block 418, the particular data item being added to the hash tables is stored in either the first or second bucket—i.e., the one identified by the path. Processing is complete as indicated by process block 419.

Figure 4B:
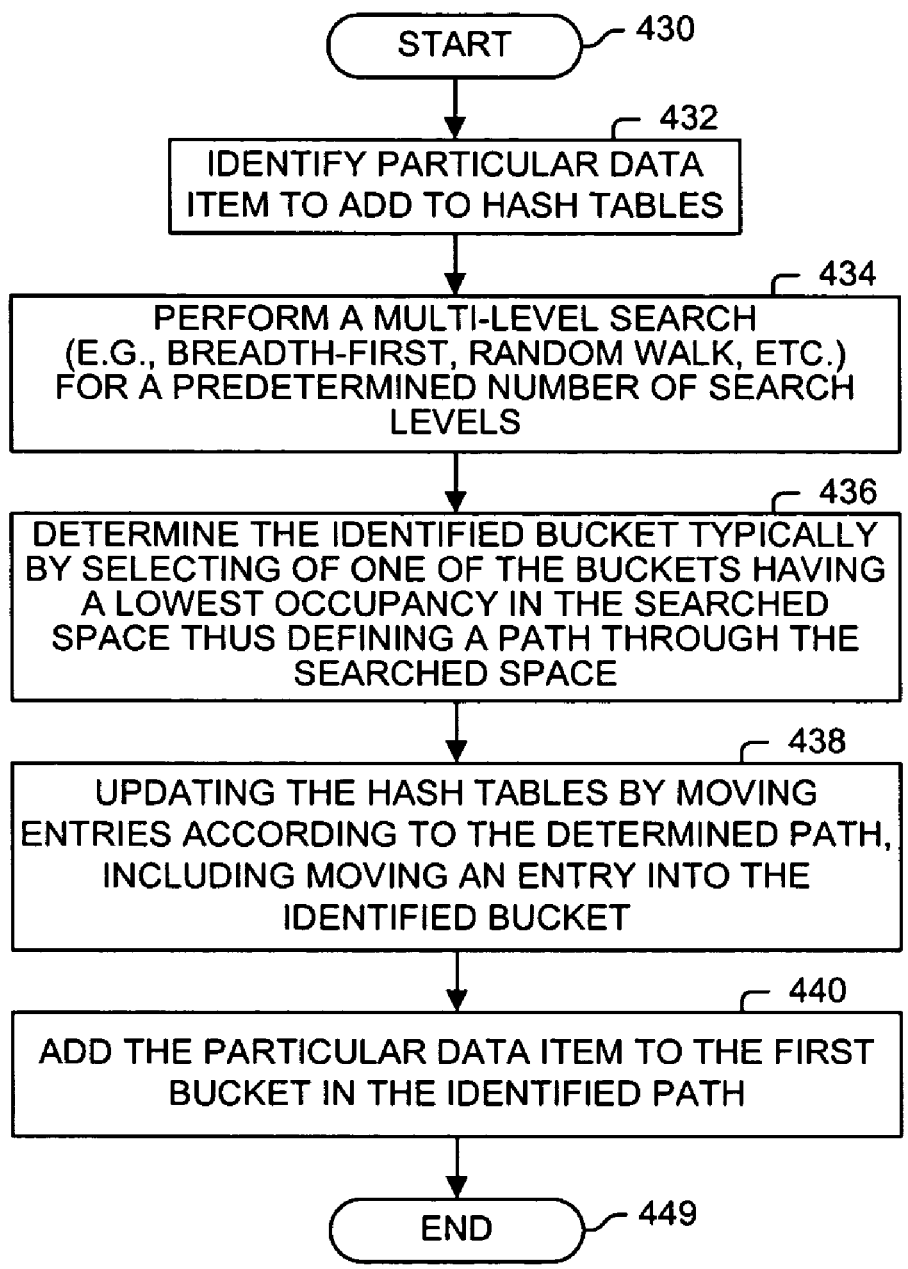
FIG. 4B is a flow diagram illustrating a process for identifying a path and migrating data items among multiple hash tables to be able to a data item as performed in one embodiment.

FIG. 4B is a flow diagram illustrating a process for identifying a path and migrating data items among multiple hash tables to be able to a data item as performed in one embodiment. In one embodiment, a predetermined number of levels are searched and a bucket is identified from the search levels, with this bucket typically having a lowest occupancy of the buckets in the searched space.

Illustrated in FIG. 4B is such a process used in one embodiment. Processing begins with process block 430, and proceeds to process block 432, wherein a particular data item to add to the hash tables is identified. Next, in process block 434, a multi-level search (e.g., using a breadth-first search, random walk, etc.) is performed for a predetermined number of levels. In process block 436, from the buckets in these searched levels, a bucket is identified having a lowest occupancy in the searched space, thus defining a path through the searched space. In process block 438, the hash tables are updated based on the identified path, which includes moving an entry into the identified bucket. In process block 440, the particular data item being added to the hash tables is added to the first bucket in the path. Processing is complete as indicated by process block 449.

Figure 4C:
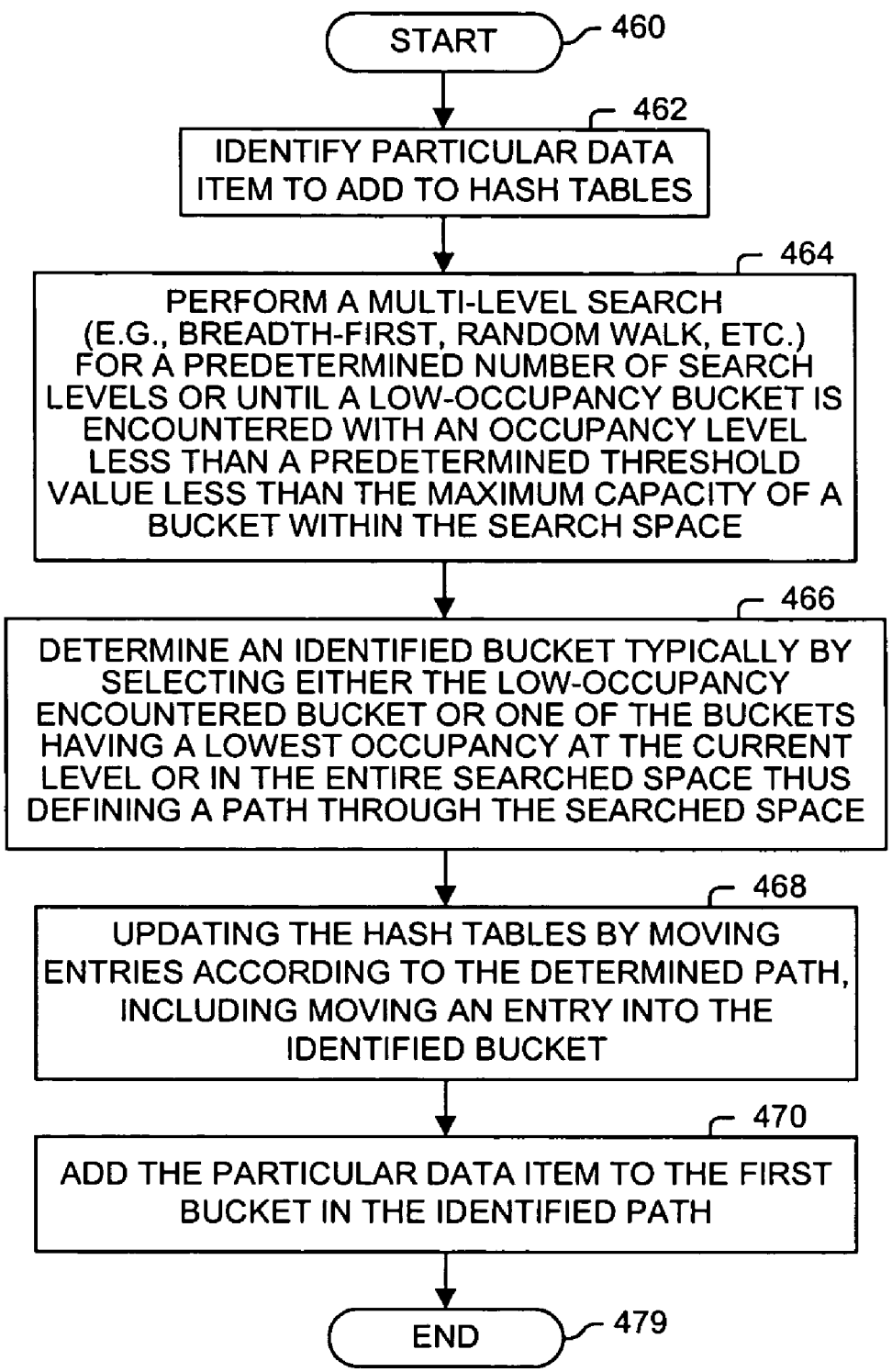
FIG. 4C is a flow diagram illustrating a process for identifying a path and migrating data items among multiple hash tables to be able to a data item as performed in one embodiment.

FIG. 4C is a flow diagram illustrating a process for identifying a path and migrating data items among multiple hash tables to be able to a data item as performed in one embodiment. It may be desirable to add entries to bucket with an occupancy level less or less than or equal to some predetermined threshold value less than a full bucket, rather than traversing the entire predetermined number of levels before identifying the last bucket of the path for shifting data items. Thus, if the occupancy of an encountered is so low, that it is advantageous (e.g., faster) to stop the search right there without impacting overall performance too much.

For example, if a bucket can store five data items, a predetermined threshold value in one embodiment could be one to four. It might be desirable to store items in buckets currently storing three or less items. One embodiment uses the first such bucket encountered. One embodiment selects one of all such buckets at a particular search level. One embodiment selects one of all of such buckets of a predetermined number of search levels.

For another example, assume a threshold value of X and a predetermined number of levels of Y are chosen. In one embodiment, normally Y levels are traversed, and then a bucket with the lowest occupancy level is selected. However, if a bucket is encountered before or at the Yth level with an occupancy level below or possible below or equal to X, then the search can stop and that bucket selected. Note, that if X is chosen to be larger than the size of a bucket, this "escape" condition will never be satisfied and the mechanism will always search all Y levels.

Illustrated in FIG. 4C is such a process used in one embodiment. Processing begins with process block 460, and proceeds to process block 462, wherein a particular data item to add to the hash tables is identified. Next, in process block 464, a multi-level search (e.g., using a breadth-first search, random walk, etc.) is performed for a predetermined number of levels unless a low-occupancy bucket (e.g., one with fewer or the same or fewer items than a predetermined threshold value typically less than the maximum number of buckets stored in the bucket) is encountered during this search and then at which point the search is terminated. In process block 466, either the low-occupancy bucket is selected as the identified bucket, or if none, then a bucket is identified with the bucket having a lowest occupancy in the searched space. Thus, a path through the searched space is defined. In process block 468, the hash tables are updated based on the identified path, which includes moving an entry into the identified bucket. In process block 470, the particular data item being added to the hash tables is added to the first bucket in the path. Processing is complete as indicated by process block 479.

Figure 5A:
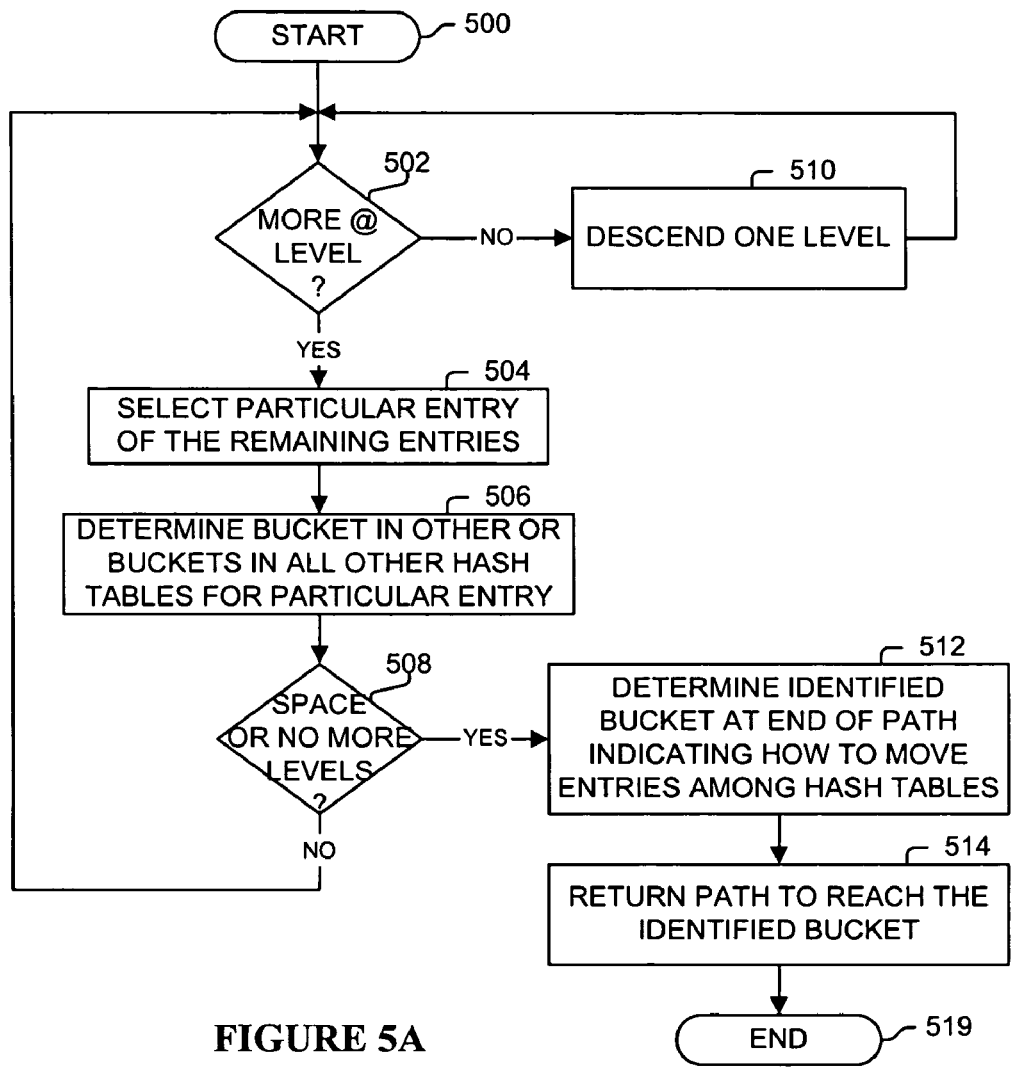
FIG. 5A is a flow diagram illustrating a process for a breadth-first search performed in one embodiment.

FIG. 5A is a flow diagram illustrating a process for a breadth-first search performed in one embodiment. Processing begins with process block 500. As determined in process block 502, while there are more entries (e.g., data items) stored at the present level of the search space, then in process block 504, a particular entry of the remaining entries at the current level is selected. In process block 506, the bucket in the other or buckets in all other hash tables for the particular entry are determined. As determined in process block 508, if there is an empty space in any of these determined bucket(s) in one embodiment, less than a threshold number of items in one embodiment, or if there are no more predetermined levels to search, then in process block 512, the identified bucket is determined as needed. The identified bucket could be the first non-empty bucket, a bucket with a lowest occupancy in a first search level having a bucket with space to add a data item, a bucket with a lowest occupancy in any of the predetermined search levels, etc. In process block 514, the path to reach the identified bucket is returned, and processing is complete as indicated by process block 519. Otherwise, processing returns to process block 502. When each entry at the current level has been expanded as determined by process block 502, the search descends one level in process block 510, and processing returns to process block 502. Note, there are an unlimited number of methods and mechanisms for performing breadth-first searches (e.g., loops, recursion, etc.), and different embodiment may employ any of these methods/mechanisms.

Figure 5B:
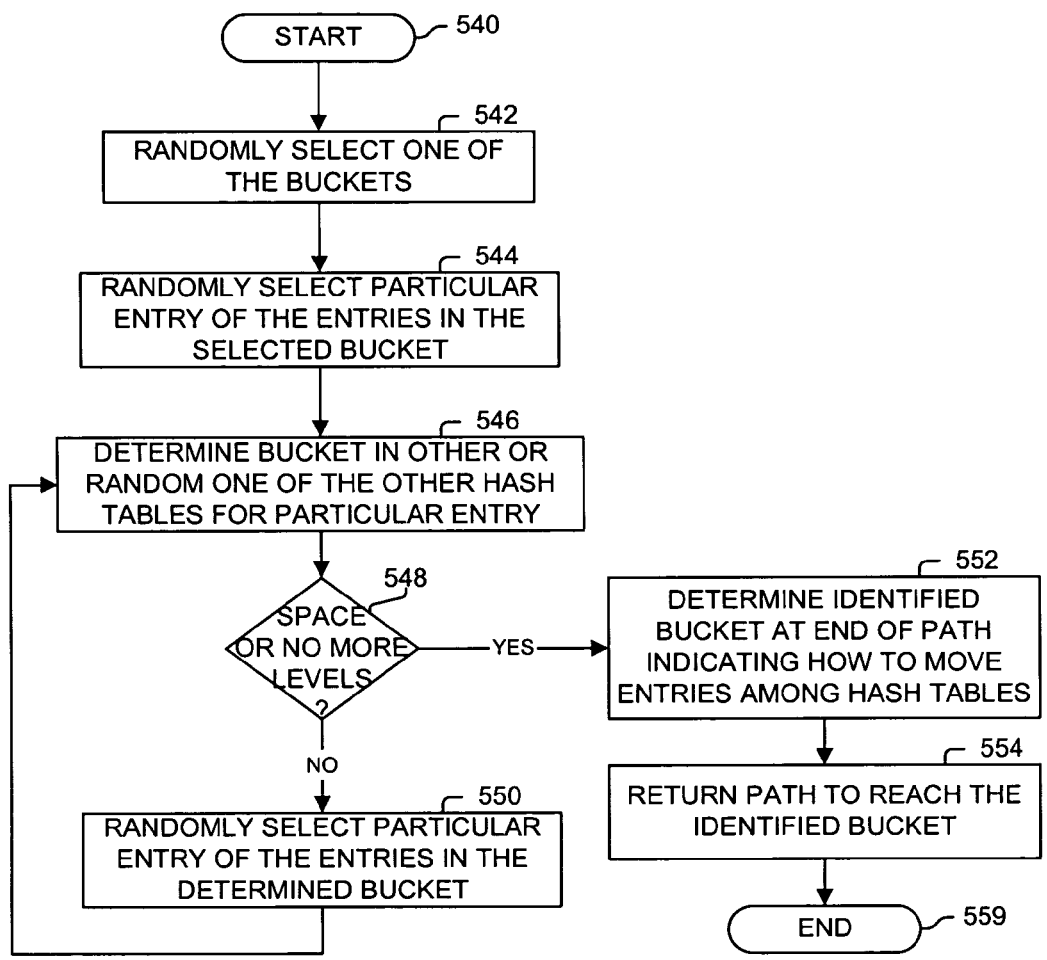
FIG. 5B is a flow diagram illustrating a process for a random walk performed in one embodiment.

FIG. 5B is a flow diagram illustrating a process for a random walk performed in one embodiment. Processing begins with process block 540, and proceeds to process block 542, wherein one of the buckets from the original hashing of the data item being added to the hash tables is randomly selected. In process block 544, one of the entries within the selected bucket is randomly selected. In process block 546, a bucket is determined in the other hash table or a random one of the other hash tables by hashing the selected entry with the corresponding hash function. As determined in process block 548, if there is an empty space in any of these determined bucket(s) in one embodiment, less than a threshold number of items in one embodiment, or if there are no more predetermined levels to search, then in process block 552, the identified bucket is determined as needed. The identified bucket could be the first non-empty bucket, a bucket with a lowest occupancy in a first search level having a bucket with space to add a data item, a bucket with a lowest occupancy in any of the predetermined search levels, etc. In process block 554, the path to reach the identified bucket is returned, and processing is complete as indicated by process block 559. Otherwise, in process block 550, one of the entries is randomly selected in the determined bucket, and processing returns to process block 546.

Figure 6:
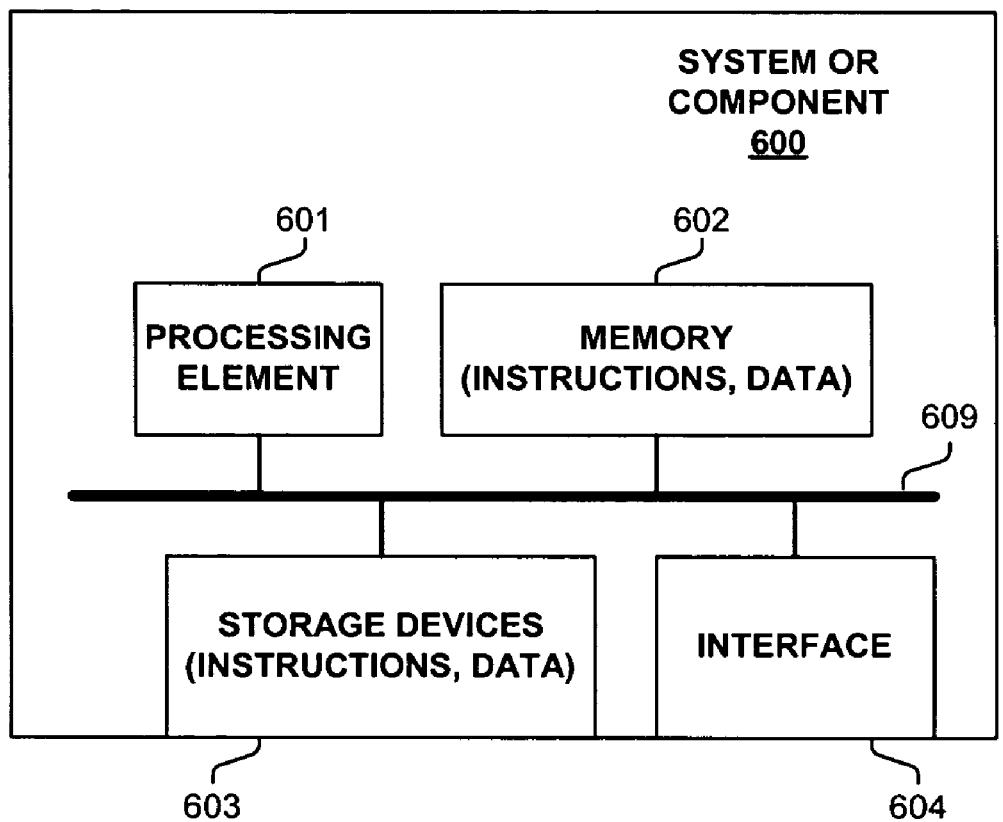
FIG. 6 is a block diagram of a system or component used in one embodiment.

FIG. 6 is a block diagram of a system or component 600 used in one embodiment searching for a path to identify where to move entries during insert operations among hash tables with storage for multiple entries per bucket and corresponding different hash functions to make room for a data item being added, and for moving the entries and adding the data item according to the identified path. In one embodiment, system or component 600 performs one or more processes corresponding to one of the flow diagrams illustrated or otherwise described herein.

In one embodiment, system or component 600 includes a processing element 601, memory 602, storage devices 603, an interface 604 for sending and receiving information/data items and/or communicating with external devices (e.g. one or more associative memories for performing a lookup operation), which are typically coupled via one or more communications mechanisms 609, with the communications paths typically tailored to meet the needs of the application. Various embodiments of component 600 may include more or less elements. The operation of component 600 is typically controlled by processing element 601 using memory 602 and storage devices 603 to perform one or more tasks or processes. Memory 602 is one type of computer-readable medium, and typically comprises random access memory (RAM), read only memory (ROM), flash memory, integrated circuits, and/or other memory components. Memory 602 typically stores computer-executable instructions to be executed by processing element 601 and/or data which is manipulated by processing element 601 for implementing functionality in accordance with an embodiment. Storage devices 603 are another type of computer-readable medium, and typically comprise solid state storage media, disk drives, diskettes, networked services, tape drives, and other storage devices. Storage devices 603 typically store computer-executable instructions to be executed by processing element 601 and/or data which is manipulated by processing element 601 for implementing functionality in accordance with an embodiment.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method used in storing values in hash tables for use in hash-based lookup operations, the method comprising:
determining a first bucket within a first hash table of a plurality of hash tables based on hashing a particular data item using a first hash function, each of the plurality of hash tables including a plurality of buckets, each of the plurality of buckets sized to store a plurality of data items, the plurality of hash tables including the first hash table and a second hash table;
determining a second bucket within the second hash table based on hashing the particular data item using a second hash function;
in response to identifying that the first and second buckets are both full, performing a breadth-first search in the first and second hash tables from the first hash bucket to identify an identified bucket having space to add a data item along a path identified by said breadth-first search to the identified bucket, the breadth-first search including traversing buckets and data items stored within the first and second hash tables based on stored data items in each particular bucket encountered;
updating the first and second hash tables to move previously stored data items based on the path identified, including moving one of said previously stored data items to the identified bucket; and
adding the particular data item to the first hash bucket:
wherein said operation of updating the first and second hash tables is performed after completion of said performing said breadth-first search in the first and second hash tables.

2. The method of claim 1, wherein the breadth-first search traverses at least two bucket levels.

3. The method of claim 1, wherein the breadth-first search traverses at least three bucket levels.

4. The method of claim 1, comprising:
identifying a second particular data item;
determining a third bucket within the first hash table using the first hash function on the second particular data item;
determining a fourth bucket within the second hash table based on hashing the second particular data item using the second hash function;
in response to identifying an empty position in either the third or fourth bucket, storing the second particular data item in the empty position.

5. A method used in storing values in hash tables for use in hash-based lookup operations, the method comprising:
performing a breadth-first search in a plurality of hash tables to identify an identified bucket having space to add a particular data item along a path identified by said breadth-first search through the plurality of hash tables to the identified bucket, the breadth-first search including traversing buckets and data items stored within the plurality of hash tables based on stored data items in particular buckets encountered and traversing to buckets in different hash tables using corresponding hashing functions for each of the items stored in said particular buckets;
updating the plurality of hash tables to move previously stored data items based on the path identified including moving one of said previously stored data items to the identified bucket; and adding the particular data item to the first bucket in the path identified;

wherein said operation of updating the plurality of hash tables is performed after completion of said performing the breadth-first search in the plurality of hash tables.

6. The method of claim 5, wherein the breadth-first search traverses at least two bucket levels.

7. The method of claim 5, wherein the breadth-first search traverses at least three bucket levels.

8. The method of claim 5, wherein said breadth-first search is performed for a predetermined number of levels, and the identified bucket is determined by selecting one of the buckets encountered during said breadth-first search with a lowest occupancy level.

9. The method of claim 8, wherein the predetermined number of levels is a constant value of at least two.

10. The method of claim 8, wherein the predetermined number of levels is a constant value of at least three.

11. The method of claim 5, wherein the identified bucket is the first bucket encountered with space available to store a data item.

12. The method of claim 5, including comparing an occupancy level of the identified bucket with a predetermined threshold occupancy level, the predetermined threshold occupancy level being less than the maximum number of data items that can be stored by the identified bucket.

13. A computer-readable medium tangibly encoded thereon computer-executable instructions for performing steps used in storing values in hash tables for use in hash-based lookup operations, said steps comprising:

performing a breadth-first search in a plurality of hash tables to identify an identified bucket having space to add a particular data item along a path identified by said breadth-first search through the plurality of hash tables to the identified bucket, the breadth-first search including traversing buckets and data items stored within the plurality of hash tables based on stored data items in particular buckets encountered and traversing to buckets in different hash tables using corresponding hashing functions for each of the items stored in said particular buckets;

updating the plurality of hash tables to move previously stored data items based on the path identified including moving one of said previously stored data items to the identified bucket; and adding the particular data item to the first bucket in the path identified;

wherein said operation of updating the plurality of hash tables is performed after completion of said performing the breadth-first search in the plurality of hash tables.

14. The computer-readable medium of claim 13, wherein the breadth-first search traverses at least two bucket levels.

15. The computer-readable medium of claim 13, wherein the breadth-first search traverses at least three bucket levels.

16. The computer-readable medium of claim 13, wherein said breadth-first search is performed for a predetermined number of levels, and the identified bucket is determined by selecting one of the buckets encountered during said breadth-first search with a lowest occupancy level.

17. The computer-readable medium of claim 16, wherein the predetermined number of levels is a constant value of at least two.

18. The computer-readable medium of claim 16, wherein the predetermined number of levels is a constant value of at least three.

19. The computer-readable medium of claim 13, wherein the identified bucket is the first bucket encountered with space available to store a data item.

20. The computer-readable medium of claim 13, including comparing an occupancy level of the identified bucket with a predetermined threshold occupancy level, the predetermined threshold occupancy level being less than the maximum number of data items that can be stored by the identified bucket.

21. An apparatus used in storing values in hash tables for use in hash-based lookup operations, the apparatus comprising:

means for performing a breadth-first search in a plurality of hash tables to identify an identified bucket having space to add a particular data item along a path identified by said breadth-first search through the plurality of hash tables to the identified bucket, the breadth-first search including traversing buckets and data items stored within the plurality of hash tables based on stored data items in particular buckets encountered and traversing to buckets in different hash tables using corresponding hashing functions for each of the items stored in said particular buckets;

means for updating the plurality of hash tables to move previously stored data items based on the path identified including moving one of said previously stored data items to the identified bucket; and means for adding the particular data item to the first bucket in the path identified;

wherein the apparatus is configured update the plurality of hash tables after completion of the breadth-first search in the plurality of hash tables.

22. The apparatus of claim 21, wherein the breadth-first search traverses at least two bucket levels.

23. The apparatus of claim 21, wherein the breadth-first search traverses at least three bucket levels.

24. The apparatus of claim 21, wherein said breadth-first search is performed for a predetermined number of levels, and the identified bucket is determined by selecting one of the buckets encountered during said breadth-first search with a lowest occupancy level.

25. The apparatus of claim 24, wherein the predetermined number of levels is a constant value of at least two.

26. The apparatus of claim 24, wherein the predetermined number of levels is a constant value of at least three.

27. A method used in storing values in hash tables for use in hash-based lookup operations, the method comprising:

performing a random walk in a plurality of hash tables to identify an identified bucket having space to add a particular data item along a path identified by said random walk through the plurality of hash tables to the identified bucket, the random walk including traversing buckets and data items stored within the plurality of hash tables based on stored data items in particular buckets encountered and randomly selecting one of the data items in an encountered bucket of said particular buckets and determining a next-level bucket using hashing function corresponding to a hashing table within the plurality of hashing tables that is different than the hashing table in which said one of the data items is currently stored;

updating the plurality of hash tables to move previously stored data items based on the path identified including moving one of said previously stored data items to the identified bucket; and adding the particular data item to the first bucket in the path identified;

wherein said operation of updating the plurality of hash tables is performed after completion of said performing the random walk in the plurality of hash tables.

28. The method of claim 27, wherein the random walk traverses at least two buckets.

29. The method of claim 27, wherein the random walk traverses at least three buckets.

30. The method of claim 27, wherein the random walk is performed for a predetermined number of levels, and the identified bucket is determined by selecting one of the buckets encountered during the random walk with a lowest occupancy level.

31. The method of claim 30, wherein the predetermined number of levels is a constant value of at least two.

32. The method of claim 30, wherein the predetermined number of levels is a constant value of at least three.

33. A method used in storing values in hash tables for use in hash-based lookup operations, the method comprising:

performing a multi-level search in a plurality of hash tables to identify an identified bucket having space to add a particular data item along a path identified by said multi-level search through the plurality of hash tables to the identified bucket, the multi-level search including traversing buckets and data items stored within the plurality of hash tables based on stored data items in each particular bucket encountered and traversing to buckets in different hash tables using corresponding hashing functions for each of the items stored in an encountered bucket; wherein said identification of the identified bucket having space to add the particular data item includes comparing an occupancy level of the identified bucket with a predetermined threshold occupancy level, the predetermined threshold occupancy level being less than the maximum number of data items that can be stored by the identified bucket;

updating the plurality of hash tables to move previously stored data items based on the path identified including moving one of said previously stored data items to the identified bucket; and adding the particular data item to the first bucket in the path identified;

wherein said operation of updating the plurality of hash tables is performed after completion of said performing the multi-level search in the plurality of hash tables.

34. The method of claim 33, wherein the identified bucket is a first bucket encountered during the multi-level search that said comparison of the occupancy level of the identified bucket with the predetermined threshold occupancy level identified to add data item to the identified bucket.

35. An apparatus comprising one or more processors and memory, wherein the memory stores one or more instructions that, when executed by said one or more processors, perform operations for storing values in hash tables for use in hash-based lookup operations, including storing a particular data item, said operations comprising:

performing a multi-level search in a plurality of hash tables for a predetermined number of levels or until a low-occupancy bucket is encountered with an occupancy level at or below a predetermined threshold occupancy level, the multi-level search including traversing buckets and data items stored within the plurality of hash tables based on stored data items in each particular bucket encountered and traversing to buckets in different hash tables using corresponding hashing functions for each of the items stored in an encountered bucket;

using the low-occupancy bucket as an identified bucket or if no low-occupancy bucket was encountered in the multi-level search, then selecting a bucket with a lowest-occupancy level from the buckets encountered during said multi-level search as the identified bucket, an identified patch being defined as the path through the plurality of hash tables to the identified bucket;

updating the plurality of hash tables to move previously stored data items based on the identified path including moving one of said previously stored data items to the identified bucket; and adding the particular data item to the first bucket in the identified path;

wherein the apparatus is configured to perform the operation of updating the plurality of hash tables after completing the operation of said performing the multi-level search in the plurality of hash tables.

36. A method used in storing values in hash tables for use in hash-based lookup operations, including storing a particular data item, the method comprising:

performing a multi-level search in a plurality of hash tables for a predetermined number of levels or until a low-occupancy bucket is encountered with an occupancy level at or below a predetermined threshold occupancy level, the multi-level search including traversing buckets and data items stored within the plurality of hash tables based on stored data items in each particular bucket encountered and traversing to buckets in different hash tables using corresponding hashing functions for each of the items stored in an encountered bucket;

using the low-occupancy bucket as an identified bucket or if no low-occupancy bucket was encountered in the multi-level search, then selecting a bucket with a lowest-occupancy level from the buckets encountered during said multi-level search as the identified bucket, an identified patch being defined as the path through the plurality of hash tables to the identified bucket;

updating the plurality of hash tables to move previously stored data items based on the identified path including moving one of said previously stored data items to the identified bucket; and adding the particular data item to the first bucket in the identified path;

wherein said operation of updating the plurality of hash tables is performed after completion of said performing the multi-level search in the plurality of hash tables.

* * * * *